(12) United States Patent
Laursen et al.

(10) Patent No.: US 7,657,524 B1
(45) Date of Patent: Feb. 2, 2010

(54) SYSTEM AND/OR METHOD FOR COMMENT MIGRATION

(75) Inventors: Michael V. Laursen, Mountain View, CA (US); Scott E. Petersen, Morgan Hill, CA (US)

(73) Assignee: Adobe Systems Incorporated, San Jose, CA (US)

( * ) Notice: Subject to any disclaimer, the term of this patent is extended or adjusted under 35 U.S.C. 154(b) by 326 days.

(21) Appl. No.: 11/193,074

(22) Filed: Jul. 28, 2005

(51) Int. Cl.
  *G06F 12/00* (2006.01)
  *G06F 7/00* (2006.01)
(52) U.S. Cl. .......... 707/6; 707/203
(58) Field of Classification Search .......... None
  See application file for complete search history.

(56) References Cited

U.S. PATENT DOCUMENTS

| 5,671,428 | A | * | 9/1997 | Muranaga et al. ......... 715/751 |
| 5,933,822 | A | * | 8/1999 | Braden-Harder et al. ...... 707/5 |
| 6,438,566 | B1 | * | 8/2002 | Okuno et al. ............ 715/233 |
| 2004/0139391 | A1 | * | 7/2004 | Stumbo et al. ............ 715/512 |
| 2005/0262089 | A1 | * | 11/2005 | Wu ..................... 707/10 |

\* cited by examiner

*Primary Examiner*—Don Wong
*Assistant Examiner*—Belinda Xue
(74) *Attorney, Agent, or Firm*—Berkeley Law & Technology Group, LLP

(57) ABSTRACT

Embodiments of methods, apparatuses, devices and systems associated with comment migration are disclosed.

22 Claims, 5 Drawing Sheets

SYSTEM AND/OR METHOD FOR COMMENT MIGRATION

BACKGROUND

Comments associated with one or more portions of a document may be displayed relative to the document such that comments appear positioned proximal to the one or more portions of the document that the comments may be associated with. If the document is revised the comments may, depending upon the extent of the revision, no longer appear positioned proximal to the one or more portions of the document that the comments may be associated with.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, procedures, and/or components that would be understood by one of ordinary skill have not been described in detail so as not to obscure claimed subject matter.

Figure 1:
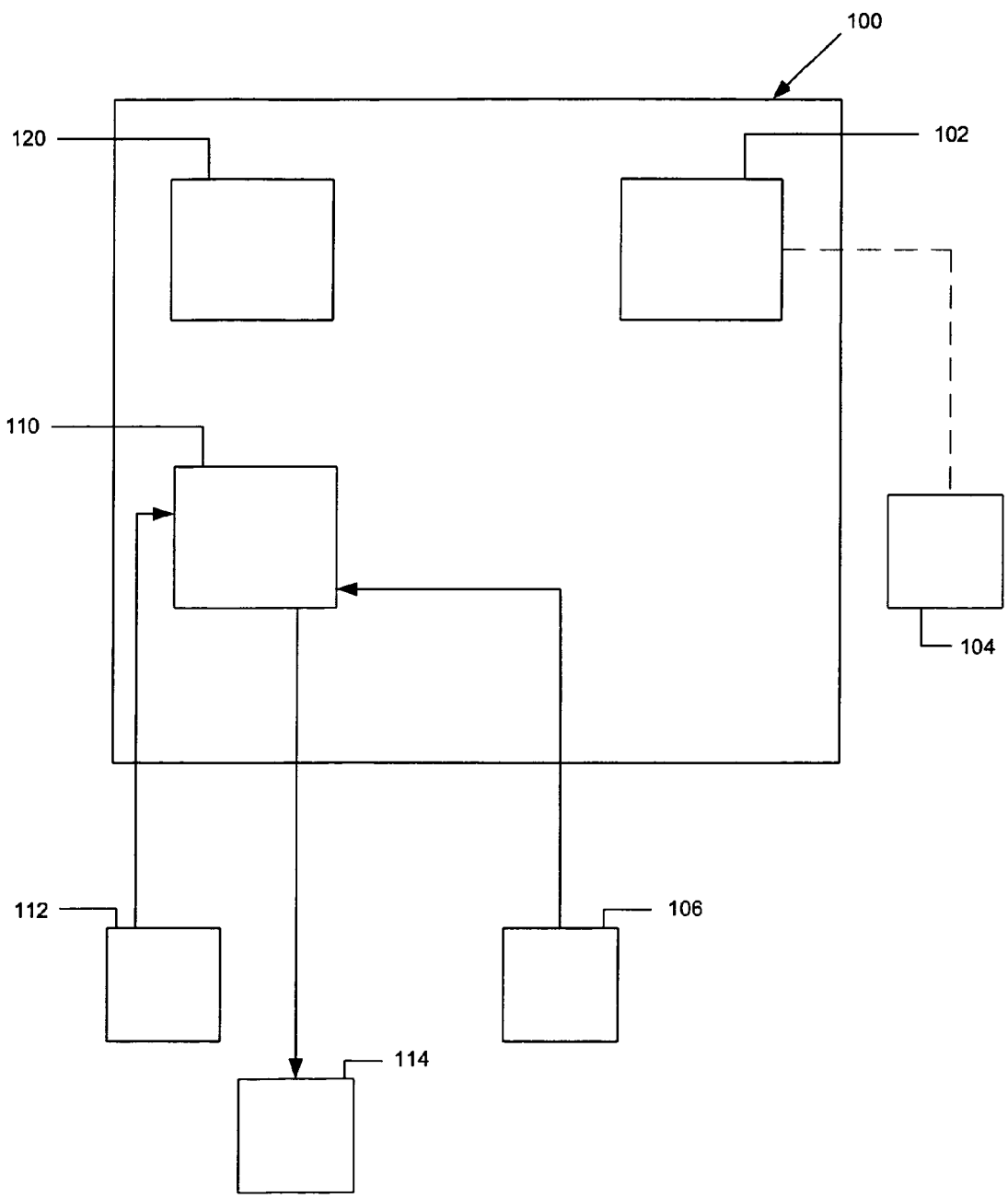
FIG. 1 is a schematic diagram of an embodiment of a comment migration engine.

FIG. 1 is a schematic diagram of an embodiment 100, such as a comment migration engine, for example. In this context a comment may mean a note, other text, and/or other marks, such as editing marks, explaining, illustrating, criticizing, questioning, expanding upon, editing and/or in any other way relating to one or more portions of a file, such as data, words, and/or other content, for example. In this context a comment may comprise a portion of a file which includes the content and/or a comment may be a portion of a file independent of the file which includes the content, for example. In context a comment may be displayed along with the content, such as by displaying the comment over a portion of the content, for example. For example, a comment may comprise observation or remark, and/or any markup and/or edit of, and/or comments relating to, a portion of data, for example. For illustrative purposes, a comment may comprise any of a wide variety of editing marks, such as a strike through of a portion of text, an underline of a portion of text, a caret which may indicate that an additional portion of text might be added at the location, for example. Additionally, a comment may comprise one or more objects including a suggestion, observation, and the like relating to a portion of text, data, and/or other content, such as one or more identifiers at least in part capable of distinguishing between one or more comments. In this context a comment migration engine may mean software, firmware, shareware, freeware, and/or combinations thereof capable of migrating one or more comments from a first data set, such as a first document, to a second data set, such as a second document, for example. In this context a data set may mean one or more computing system readable files having stored therein data, such as text, for example. In this context, a document may mean one or more computing system readable files, that when displayed such as with a computing system and/or a graphical user interface, are capable of at least in part conveying one or more pieces of information, such as one or more portions of text and/or data stored in one or more computing system and/or computing platform readable files, for example. In this context migrating a comment may mean moving one or more comments from a first location to a second location, such as by changing a set of coordinates associated with one or more comments within a file, such as a comment file and/or a document, for example. Though, it should be noted that this is merely an illustrative example relating to migrating one or more comments and that claimed subject matter is not limited in this regard.

Embodiment 100 may include a comment reader 102, for example. Comment reader 102 may be software, firmware, shareware, freeware, and/or combinations hereof configured to read a comment file 104. In addition, comment reader 102 may comprise a sub-routine of embodiment 100, an object formed by embodiment 100, a program capable of interacting with embodiment 100, and/or combinations thereof, for example. Comment reader 102 may be capable of reading one or more comment files, such as comment file 104 and/or extract one or more pieces of information from comment file 104, such as information relating to one or more comments and/or positioning of one or more comments, for example. Additionally, comment reader 102 may be capable of providing the one or more pieces of information to embodiment 100, for example. By way of example, comment file 104 may include one or more comments on a data file 106. In this context, comment file 104 may comprise one or more data structures stored in a file that may be separate from data file 106. In addition, comment file 104 and/or data file 106 may comprise one or more data structures stored in a single file (not shown), for example. Though it should be noted that these are merely examples of a data file and that claimed subject matter is not limited in this regard. In this context, comment file 104 may include a variety of markups of and/or relating to data file 106. For example, comment file 104 may comprise one or more suggested edits of data file 106. For additional example, comment file 104 may comprise one or more comments and/or suggestions relating to content and/or structure of data file 106. Comment file 104 may additionally include one or more coordinates for the one or more comments, for example. In this context, the one or more coordinates may indicate a relative and/or absolute position, such as within a display area of a graphical user interface which may be presented on a display device such as a monitor, for displaying the one or more comments, for example. In this context displaying may mean to present one or more graphical representations, such as with one or more display devices associated with one or more computing platforms, for example. The one or more comments in comment file 104 may be associated with, commenting on, and/or related to one or more portions of data file 106. Additionally, comment file 104 may be configured such that, when displayed in conjunction with data file 106, such as by overlaying a visual representation of comment file 104 over a visual representation of data file 106, for example, the one or more comments may appear positioned proximal, and/or in some other way relative, to their respective associated one or more portions of data file 106, for example. Though, again it should be noted that the above is merely an illustrative example and that claimed subject matter is not limited in this regard.

Embodiment 100 may further comprise a document comparing component, such as document comparison engine 110, for example. Document comparison engine 110 may comprise software, firmware, shareware, freeware, and/or combinations thereof to compare one or more documents and/or data sets. In addition, document comparison engine 110 may comprise a sub-routine of embodiment 100, an object formed by embodiment 100, a program configured to interact with embodiment 100, and/or combinations thereof, for example. An example of one such document comparing component is disclosed in co-pending U.S. patent application Ser. No. 10/272,858. Though, again it should be noted that this is merely an illustrative example of a comparing component and that claimed subject matter is in no way limited in this regard. By way of example, document comparison engine 110 may be operable to compare first data file 106 and a second data file 112. In this context compare may mean to examine the character or qualities one or more thing, such as to discover similarities and/or differences, for example. In this context, comparing first data file 106 and second data file 112 may comprise determining similarities and/or difference between a portion of data in first data file 106 and/or all data in first data file 106 and a portion of data in second data file 112 and/or all data in second data file 112, for example. Additionally, comparing first data file 106 and second data file 112 may comprise determining similarities and/or differences between one or more words in first data file 106 and one or more words in second data file 112, for example. For purposes of illustration, comparing first data file 106 and first data file 112 may comprise determining one or more locations of one or more similar and/or substantially the same combinations of one or more words in first data file 106 and second data file 112, respectively. Though, again, it should be noted that these are merely illustrative examples of comparing files and that claimed subject matter is not limited in this regard. Additionally, comparing first data file 106 and second data file 112 may comprise determining similarities and/or differences between one or more structural elements of first data file 106 and one or more structural elements of second data file 112, for example. In this context a structural element may mean one or more elements which may indicate that a data file may be arranged in a pattern of organization, such as organizational aspects of a document, such as one or more portions of an outline, one or more paragraphs, one or more sections of a document, one or more hierarchical aspects of a document, and/or other organizational aspects, for example. For purposes of illustration, comparing first data file 106 and second data file 112 may comprise determining one or more locations of one or more similar and/or substantially the same structural elements in first data file 106 and second data file 112, respectively. Though, again, it should be noted that these are merely illustrative examples of comparing files to determine similarities and/or differences between one or more data files and that claimed subject matter is not limited in this regard.

For example, in this context, comparing one or more documents and/or data sets may comprise obtaining a first token stream from a first document and a second token stream from a second document, and comparing the first and second token streams to identify at least a group of tokens that may be substantially similar in the first and second token streams. For example, one or more tokens that may be substantially similar may comprise common sub-sequences, which may be the same and/or substantially the same in the first and second token streams. Though, again, it should be noted that this is merely an illustrative example relating to comparing documents and that claimed subject matter is not limited in this regard. For further example, obtaining a first token stream and a second token stream may comprise receiving text and/or other data and converting the text and/or other date into the first and second token streams. For additional example, comparing the first and second token streams may comprise using a predefined sequences differencing technique to identify sub-sequences of words common to the first and second token streams, selecting a sub-sequence from the identified sub-sequences of words, and extending the selected sub-sequence to include one or more additional sub-sequences and one or more intervening words from the first and second token streams in order to form one or more similar-tokens group.

For example, when the tokens correspond to words, these can be words in a language, and the first and second token streams can correspond to a reading order for the words. Though, again it should be noted that this is merely an illustrative example relating to comparing documents and that claimed subject matter is not limited in this regard. For additional example, obtaining a first token stream and a second token stream may comprise receiving style information for, and/or receiving structure information representing a structure of, one or more electronic documents, and converting the style information into the first and second token streams and/or converting the structure information into the first and second token streams representing structural elements of the one or more electronic documents. Though, again, it should be noted that this is merely an illustrative example relating to comparing documents and that claimed subject matter is in no way limited in this regard.

For further example, comparing documents may further comprise obtaining additional common sub-sequences and/or one or more additional groups of tokens that are substantially similar in the first and second token streams, combining matched sets of tokens based on their order in the first and second token streams while disregarding intervening tokens, the matched sets of tokens including the similar-tokens groups and the additional common sub-sequences, and presenting matched token information corresponding to the combined matched sets of tokens to represent changes in document flow.

For additional example, comparing documents may further comprise identifying sub-sequences common to a first token stream and a second token stream, designating a first block of subsequences in the first token stream, and designating a second block of sub-sequences in the second token stream. The first block of sub-sequences including two or more of the identified common sub-sequences, the second block of sub-sequences including the two or more of the identified common sub-sequences, and at least one of the first and second blocks includes one or more intervening tokens separating at least two of the two or more of the identified common sub-sequences. Document comparison engine 100 may further be adapted to generate a comparison file 114. In this context, comparison file 114 may comprise one or more indicators of one or more similarities and/or differences between compared data files, such as first data file 106 and second data file 112, for example. In this context, comparison file 114 may comprise one or more data structures stored in memory, for example. Though it should be noted that this is just an illustrative example of a comparison file and claimed subject matter is not limited in this regard. The one or more indicators may comprise one or more pieces of information indicating one or more locations in second data file 112 of similar and/or substantially the same data as may be present at one or more locations in first data file 106, for example. For example, comparison file 114 may comprise a mapping of one or more words and/or one or more structural elements in first data file 106 to similar and/or substantially the same one or more words and/or one or more structural elements in second data file 112. Again, it should be noted that this is merely an example of a comparison file and that claimed subject matter is not limited in this regard. Embodiment 100 may further comprise a comment migrator 120. Comment migrator 120 may comprise software, firmware, shareware, freeware, and/or combinations thereof configured to migrate comments, such as those contained in comment file 104, associated with a data file, such as first data file 106, to a different data file, such as second data file 112, for example. In addition, comment migrator 120 may comprise a sub-routine of embodiment 100, an object formed by embodiment 100, a program configured to interact with embodiment 100, and/or combinations thereof, for example. Though, again, it should be noted that this is merely an illustrative example of comment migration and that claimed subject matter is not limited in this regard. In this context migrating may comprise changing one or more position indicators, such as coordinates, of one or more comments in comment file 104. In this context coordinates may mean one or more positions within a graphical representation of a data set, such as positions on a coordinate system of a page within the graphical representation, for example. In addition, migrating may comprise adding and/or modifying one or more indicator associated with a comment, for example. For example a comment associated with one or more portions of first data file 106 and may, when displayed such as in a manner discussed above, be positioned proximal to the associated one or more portions of first data file 106. For illustrative purposes, once the comment has been migrated the comment may be associated with one or more portions of second data file 112, and may, when displayed such as in a manner discussed above, be positioned proximal to the associated one or more portions of second data file 112. In this context, the one or more portions of first data file 106 and the one or more portions of second data file 112 may be similar and/or substantially the same, as determined at least in part by a comparison of first data file 106 and second data file 112, such as a comparison of first data file 106 and second data file 112 by document comparison engine 110, for example. In this context similar may mean that one or more portions of first data file 106 and/or second data file 112 may have a determined and/or desired quantity of characteristics in common with one another, for example. Though, again, it should be noted that this is merely an illustrative example relating to comment migration and that claimed subject matter is not limited in this regard.

Figure 2:
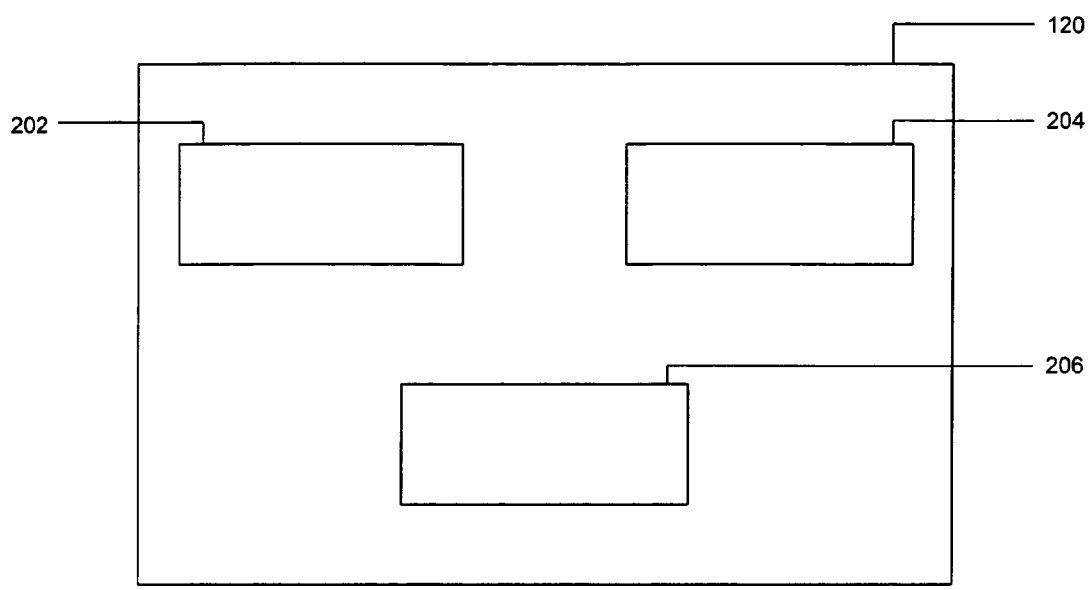
FIG. 2 is a schematic diagram of an embodiment of a document comparing component.

FIG. 2 depicts a schematic diagram of an embodiment of a comment migrator, such as comment migrator 120. As discussed above, comment migrator 120 may comprise software, firmware, shareware, freeware, and/or combinations thereof configured to migrate one or more comments, such as one or more comments in comment file 104, based at least in part on one or more differences and/or similarities between a plurality of data files, such as first data file 106 and second data file 112, for example. In a particular embodiment, comment migrator 120 may comprise a sub-routine of embodiment 100, an object formed at least in part by embodiment 100, an program configured to communicate with embodiment 100, and/or combinations thereof, for example. Though, it should be noted that this is merely an illustrative example of how a comment migrator may be implemented in a computing platform and that claimed subject matter is not limited in this regard. Comment migrator 120 may be configured to receive and/or obtain information indicative of one or more comments and associated coordinates from comment file 104, such as by receiving one or more messages from comment reader 102, for example and/or opening comment file 104, for example. Comment migrator 120 may be further capable of receiving and/or obtain information indicative of a comparison of a plurality of data files, such as comparison file 114, for example. It should, however, be noted that this is merely an illustrative example of a comment migrator and that claimed subject matter is not limited in this regard.

Comment migrator 120 may further comprise one or more logic components, such as first logic component 202, second logic component 204, and/or third logic component 206, for example. First logic component 202 may comprise one or more instructions and/or rules capable of migrating one or more comments based at least in part on a comparison of similarities and/or differences between a plurality of data files, such as first data file 106 and second data file 112, for example. Additionally, first logic component may be capable of migrating the one or more comments by changing one or more coordinates for the one or more comments based at least in part on a comparison of similarities and/or differences between a plurality of data files, such as first data file 106 and second data file 112, for example. By way of example, first logic component 202 may be capable of identifying one or more words in first data file 106 that may be associated with a first comment from comment file 104. In this context, the one or more words may be determined based on proximity of the one or more words to the first comment if comment file 104 is displayed along with data file 106, for example. First logic component 202 may be further capable of determining instances in second data file 112 of those one or more words, such as by examining comparison file 114, for example. Though, again it should be noted that this is merely an illustrative example relating to comment migration and that claimed subject matter is not limited in this regard. In the event that the one or more words are located within second data file 112, then first logic component 202 may modify coordinates associated with the first comment based at least in part on the comparison file 114. For example, first logic component 202 may modify the coordinates so that when comment file 104 is shown along with second data file 112, the first comment appears proximal to an instance of the one or more words in the second data file 112. Though, again, it should be noted that this is merely an illustrative example relating to comment migration and that claimed subject matter is not limited in this regard.

Second logic component 204 may comprise one or more instructions and/or rules capable of changing one or more coordinates for one or more comments based at least in part on a comparison of similarities and/or differences between a plurality of data files, such as first data file 106 and second data file 112, for example. By way of example, second logic component 204 may be capable of identifying one or more structural elements in first data file 106 that may be associated with a second comment from comment file 104. In this context, the one or more structural elements may be determined based on proximity of the one or more structural elements to the second comment if comment file 104 is displayed along with data file 106, for example. Second logic component 204 may be further capable of determining instances in second data file 112 of those one or more structural elements, such as by examining comparison file 114, for example. Though, again it should be noted that this is merely an illustrative example relating to comment migration and that claimed subject matter is not limited in this regard. In the event that the one or more structural elements are located within second data file 112, then second logic component 204 may modify coordinates associated with the second comment based at least in part on the comparison file 114. For example, second logic component 204 may modify the coordinates so that when comment file 104 is shown along with second data file 112, the second comment appears proximal to an instance of the one or more structural elements in the second data file 112. Though, again, it should be noted that this is merely an illustrative example relating to comment migration and that claimed subject matter is not limited in this regard.

Figure 3A:
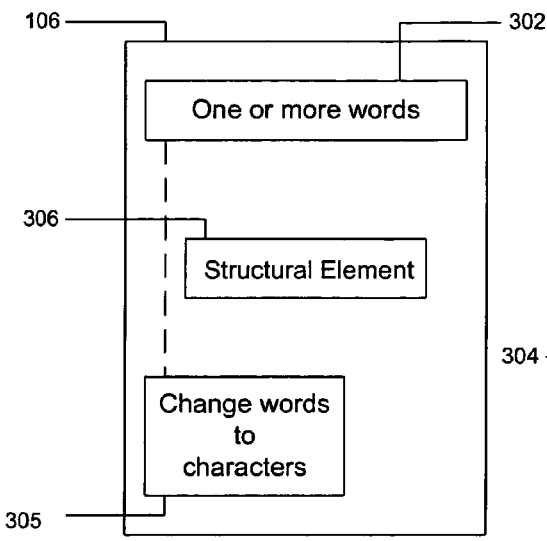
FIGS. 3A and 3B are additional schematic diagrams of a first document and a second document including one or more comments.
Figure 3B:
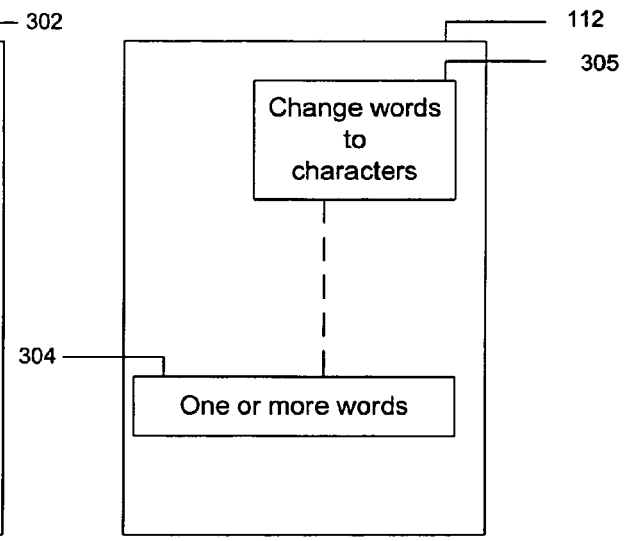

As discussed above, comment migrator 120 may further comprise a third logic component, such as third logic component 206, for example. Third logic component 206 may comprise one or more instructions and/or rules capable of determining for one or more comments whether to migrate the one or more comments based on one or more words, one or more structural elements, and/or a combination thereof. With regard to FIG. 3A and FIG. 3B, for example, first logic component 202 may determine that the same one or more words appear once in first data file 106 and once in second data file 112, as indicated, respectively, by box 302 and 304. In addition, third logic component 206 may determine that a first comment 305 was positioned such that when displayed along with first data file 106 the first comment was proximal to, and/or otherwise visibly associated with, the one or more words in box 302. In further addition, third logic component 206 may determine that first comment 305 should be migrated such that, when displayed along with second data file 112, first comment 305 may be positioned proximal to, and/or otherwise visibly associated with, the one or more words in box 304. Though, again, it should be noted that this is merely an illustrative example relating to a comment migrator and that claimed subject matter is not limited in this regard. Additionally, if the one or more words in box 302 do not appear in a similar and/or the same manner in second data file 112, then third logic component 206 may attempt to migrate the first comment based at least in part on one or more structural elements, such as structural element 306. In this context structural element 306 may comprise one or more paragraphs, section breaks, and/or other structural elements, for example, in first data file 106. Though it should be noted that these are merely illustrative examples relating to comment migration and that claimed subject matter is not limited in this regard.

Figure 4A:
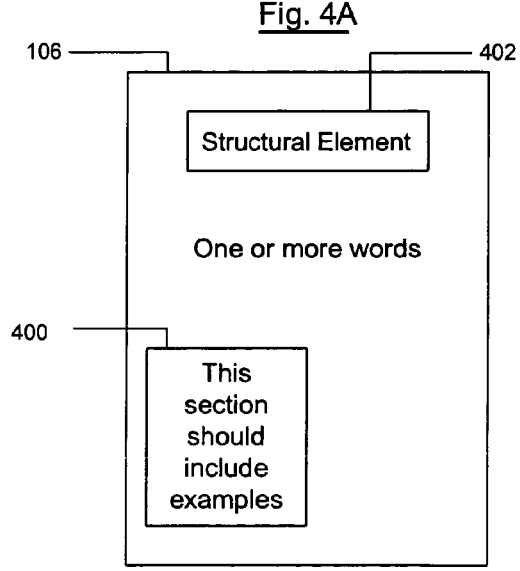
FIGS. 4A and 4B are schematic diagrams of a first document and a second document including one or more comments.
Figure 4B:
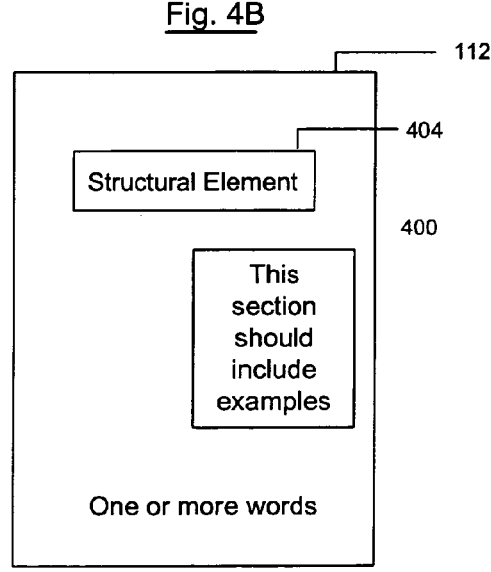

With regard to FIGS. 4A and 4B, for a second comment 400 that may be less clearly associated with one or more words in first text file 106, such as a note, for example referring to a section of a document, third logic component 206 may determine that second comment 400 may be migrated based at least in part on one or more structural elements, such as structural elements 402 and 404, for example. In this context structural elements 402 and 404 may comprise one or more paragraphs, one or more sections breaks, one or more levels within a hierarchical structure, and/or other structural elements, for example. It should be noted that this is merely an illustrative example relating to structural elements and that claimed subject matter is not limited in this regard. In this context structural element 402 may comprise a first paragraph including a first set of words (not shown). In addition, structural element 404 may comprise a second paragraph including a second set of words (not shown), for example. Though, again, it should be noted that this is merely an illustrative example relating to one or more structural elements and that claimed subject matter is not limited in this regard. In a particular embodiment, for example, third logic component 206 may determine a representative point for second comment 400, such as a center point of second comment 400. Again, it should be noted that this is merely an illustrative example relating to how a comment may be migrated based at least in part on one or more structural elements and that claimed subject matter is in no way limited in this regard. Third logic component 206 may then examine first data file 106 for structural elements, such as structural element 402 and/or one or more words at a corresponding point in first data file 106. If for example, one or more words are at and/or proximal to the representative point then third logic component 206 may attempt to migrate the second comment based at least in part on the one or more words if those one or more words appear in a similar and/or substantially the same manner in second data file 112. If, however, there are one or more structural elements at and/or proximal to the representative point, then third logic component 206 may attempt to migrate the second comment based at least in part on the one or more structural elements if those one or more structural elements appear in a similar and/or substantially the same manner in second data file 112. For example, third logic component 206 may attempt to migrate comment 400 based at least in part on structural element 404 in second data file 112. In this context, third logic component 206 may migrate comment 400 so that its center point is positioned proximal to structural element 404 in second document 112, for example. Though, again, this is merely an illustrative example relating to comment migration and claimed subject matter is in no way limited in this regard. Additionally, the third logic component 206 may first attempt to migrate the second comment based at least in part on one or more words, and if the one or more words do not appear in a similar and/or substantially the same manner in second data file 112 then third logic component 206 may attempt to migrate the second comment based at least in part on one or more structural elements, and vice versa, for example. Though, again, it should be noted that this is merely an illustrative example relating to a comment migrator and that claimed subject matter is in no way limited in this regard.

Third logic component 206 may determine, based at least in part on the examination of first data file 106, that the second comment should be migrated based at least in part on structural elements of first data file 106. For example, third logic component 206 may examine comparison file 114 at least in part to determine if one or more structural elements from first data file 106 exist in second data file 112. If the one or more structural elements are present then third logic component 206 may migrate the second comment such that when displayed along with second data file 112 the second comment may appear proximal to the one or more structural elements. If the one or more structural elements do not appear in a similar and/or the same manner in second data file 112, then third logic component 206 may determine that the second comment may be migrated based at least in part on one or more words in first data file 106, for example. Again, it should be noted that this is merely an illustrative example relating to comment migration and that and that claimed subject matter is in no way limited in this regard.

Additionally, third logic component 206 may attempt to first migrate one or more comments based at least in part on one or more words in first data file 106 that may be associated with the one or more comments. If, for example, the one or more words do appear in a similar and/or substantially the same manner in second data file 112 then third logic component 206 may migrate the one or more comments based at least in part on the one or more words. If, for example, the one or more words do not appear in a similar and/or substantially the same manner in second data file 112 then third logic component 206 may attempt to migrate the one or more comments based at least in part on the one or more structural elements of first data file 106. Likewise, third logic component 206 may attempt to migrate one or more comments based at least in part on one or more structural elements in first data file 106 that may be associated with the one or more comments. If, for example, the one or more structural elements do appear in a similar and/or the same manner in second data file 112, then third logic component 206 may migrate the one or more comments based at least in part on the one or more structural elements. If, for example, the one or more structural elements do not appear in a similar and/or the same manner in second data file 112, then third logic component may attempt to migrate the one or more comments based at least in part on the one or more words in first data file 106. Though, again, it should be noted that this is merely an illustrative example relating to a comment migrator and that claimed subject matter is not limited in this regard. Additionally, if one or more associated words and one or more associated structural elements both appear in second data file 112, then third logic component 206 may migrate the one or more comments based at least in part on the one or more words and/or the one or more structural elements, for example. Furthermore, if one or more associated words and/or one or more associated structural elements do not appear in second data file 112, then third logic component 206 may make no changes to the associated comment, for example. In addition, third logic component 206 may move the associated comment to an end of comment file 104 such that when displayed along with second date file 112 the associated comment may be shown as not associated with a particular portion of second data file 112, for example. In further addition, third logic component 206 may move the associated comment to a separate portion of comment file 104, and/or remove the associated comment from comment file 104, for example. Though, again, it should be noted that this is merely an illustrative example of comment migration and that claimed subject matter is not limited in this regard.

By way of example, comment migrator 120 may attempt to migrate one or more comments based on the type of comment. In the case comments that may be closely associate with one or more words, such as comment 305, for example, in first data file 106, comment migrator 120 may attempt to migrate the comment such that when displayed in conjunction with second data file 112, the comments may appear at a similar and/or substantially the same position relative to one or more words as the comments would appear when displayed along with first data file 106. Examples of comments that may be closely associated with one or more words may include, but are in no way limited to, carets, strikethroughs, underlines, similar comments, and/or combinations thereof. In the case of notes and the like that may not be closely associated with one or more words, comment migrator 120 may attempt to migrate the comments based at least in part on one or more words and/or one or more structural elements in data file 106 that may be proximal to a determined point of the comment, such as a center point of a note, for example. Though, again, it should be noted that this is merely an illustrative example relating to a comment migrator and that claimed subject matter is not limited in this regard.

Figure 5:
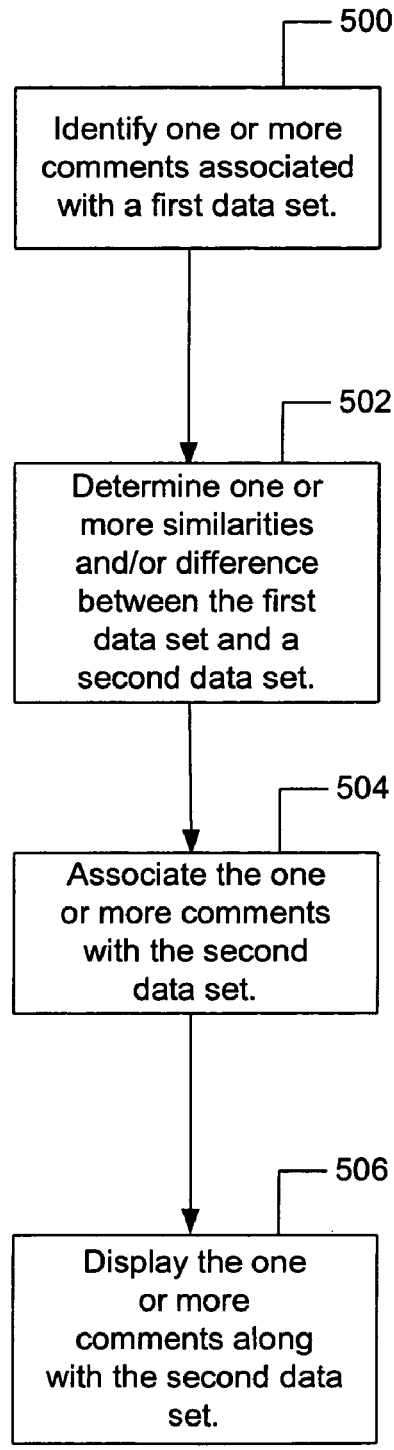
FIG. 5 is a flowchart of an embodiment of a process of comment migration.

FIG. 5 depicts a flowchart of an embodiment of a method relating to comment migration. With regard to box 500, an embodiment, such as embodiment 100, may identify one or more secondary data sets, such as one or more comment files, associated with one or more portions of a first data set, such as a document, for example. In this context a data set may mean one or more portions of data organized in a file, such as a document, for example. In this context a secondary data set may mean a data set comprising one or more portions of data associated with one or more portions of data in another data set, such as one or more comments associated with one or more words and/or one or more structures in a data file, such as a document, for example. With regard to box 502, an embodiment, such as embodiment 100, may determine one or more differences and/or similarities between the first data set and the second data set by comparing the first data set and the second data set, for example. In this context, comparing may comprise comparing one or more words in the first data set and one or more words the second data set, for example. Additionally, comparing may comprise comparing one or more structural elements in the first data set and one or more structural elements in the second data set, for example. Based at least in part on the comparison of the first data set and the second data set, embodiment 100 may, as discussed above, generate a comparison file, such as comparison file 114. In this context the comparison file may comprise one or more indications of one or more similarities and/or one or more differences between the first data set and the second data set. By way of example, comparison file 114 may comprise a mapping of one or more words and/or structural elements in the first data set to similar and/or substantially the same one or more words and/or structural elements in the second data set. Though, again, it should be noted that this is merely an illustrative example relating to a migration process and that claimed subject matter is not limited in this regard. With regard to box 504, an embodiment, such as embodiment 100, may associate the one or more secondary data sets with one or more portions a second data set based at least in part on one or more determined differences and/or similarities between the first data set and the second data set. In this context associating the one or more secondary data sets with one or more portions of a second data set may comprise migrating the one or more secondary data sets, such as by changing coordinates associated with one or more portions of the one or more secondary data sets, for example. Additionally, embodiment 100, may associate the secondary data set and/or one or more portions of the secondary data set with one or more portions of the second data set based at least in part on one or more portions of the comparison file, for example, such that the secondary data set may be associated with one or more words and/or one or more structural elements in the second data set that may be similar and/or substantially the same as one or more words and/or one or more structural elements in the first data set. Again, it should be noted that this is merely an illustrative example relating to a migration process and that claimed subject matter is not limited in this regard. With regard to box 506, an embodiment, such as embodiment 100, may display the one or more comments along with the second data set. The secondary data set may be associated with the second data set such that one or more portions of the secondary data set may appear proximal to the associated one or more words and/or one or more structural elements, for example. Though, again, it should be noted that this is merely an illustrative example and that claimed subject matter is not limited in this regard.

Figure 6:
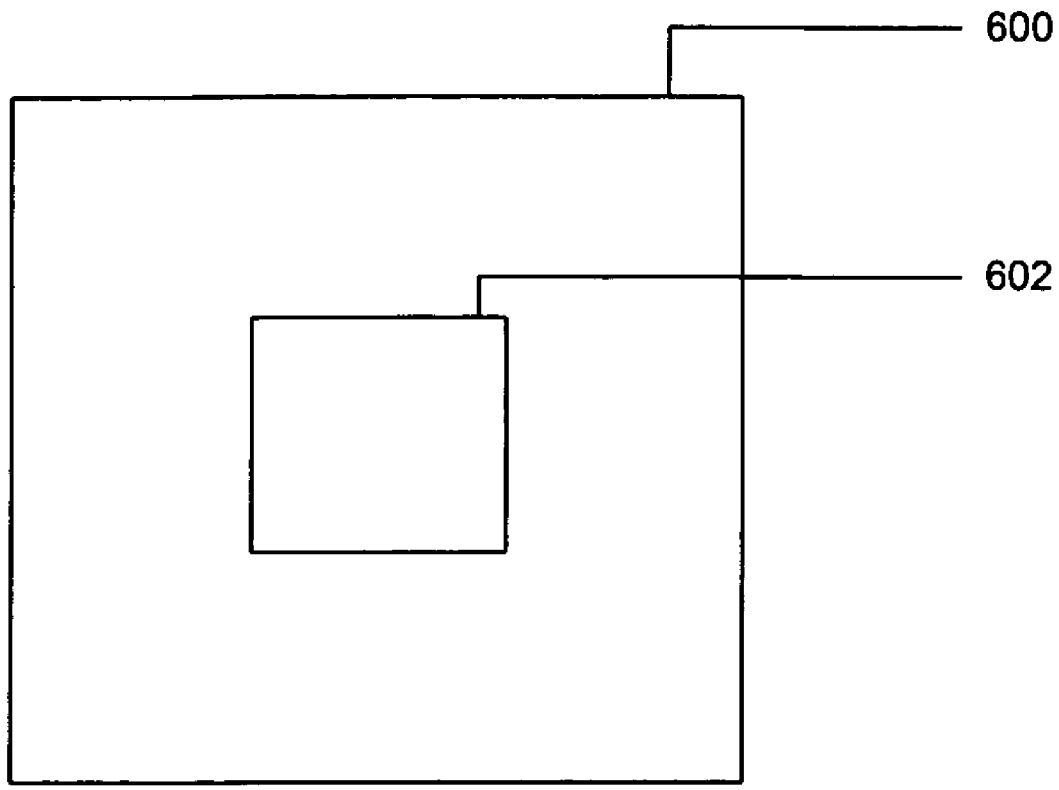
FIG. 6 is a schematic diagram of an article having stored thereon instructions that may, when executed, result in an embodiment of a method of comment migration.

FIG. 6, is a schematic diagram of an article 600 having stored thereon instructions 602 that may, when executed, such as by one or more computing systems, result in an embodiment such as one or more embodiments described above. For example instructions 602 may, when executed, result in an embodiment of a method of comment migration. Though again it should be noted that this is merely an illustrative example and that claimed subject matter is not limited in this regard.

It will, of course, also be understood that, although particular embodiments have just been described, the claimed subject matter is not limited in scope to a particular embodiment or implementation. For example, one embodiment may be in hardware, such as implemented on a device or combination of devices, as previously described, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, features that would be understood by one of ordinary skill were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method comprising:
   executing instructions on a computing platform to:
   identify one or more comments associated with a portion of a first document;
   identify a relationship between said one or more comments and said portion of the first document;
   associate said one or more comments with an associated portion of a second document, said associated portion of a second document chosen based at least in part on one or more determined similarities between said first document and said second document;
   modify said relationship based, at least in part, on similarities and/or differences between an arrangement of one or more paragraphs, one or more sections, and/or one or more hierarchical aspects of said first document and said second document;
   migrate said one or more comments into said second document based, at least in part, on said modified relationship; and
   display said one or more comments and said second document such that said one or more comments are positioned proximal to said associated portion of said second document.

2. The method of claim 1, further comprising executing instructions on said computing platform to determine said one or more determined similarities between said first document and said second document by comparing said first document and said second document.

3. The method of claim 2, wherein said second document comprises one or more portions of said first document.

4. The method of claim 3, wherein said second document comprises a modified version of said first document.

5. The method of claim 4, wherein comparing said first document and said second document comprises comparing one or more words in said first document and one or more words in said second document.

6. The method of claim 4, wherein comparing said first document and said second document comprises comparing one or more structural elements of said first document and one or more structural elements of said second document.

7. An apparatus comprising:
   a computing platform comprising one or more processors and one or more memories, said one or more processors programmed with instructions stored in said one or more memories to identify one or more comments associated with an associated portion of a first document;
   identify a relationship between said one or more comments and said associated portion of the first document;
   associate said one or more comments with a portion of a second document, said portion of a second document chosen based at least in part on one or more determined similarities between said first document and said second document;
   modify said relationship based, at least in part, on similarities and/or differences between an arrangement of one or more paragraphs, one or more sections, and/or one or more hierarchical aspects of said first document and said second document
   migrate said one or more comments into said second document based, at least in part, on said modified relationship; and
   display said one or more comments and said second document such that said one or more comments are positioned proximal to said associated portion of said second document.

8. The apparatus of claim 7, wherein said one or more processors are further programmed with instructions stored in said one or more memories to compare said first document and said second document and determine said one or more difference between said first document and said second document.

9. The apparatus of claim 8, wherein said one or more processors are further programmed with instructions stored in said one or more memories to compare said first document and said second document by comparing one or more words of said first document and one or more words of said second document.

10. The apparatus of claim 8, wherein said one or more processors are further programmed with instructions stored in said one or more memories to compare said first document and said second document by comparing one or more structural elements of said first document and one or more structural elements of said second document.

11. The apparatus of claim 9, wherein said one or more processors are further programmed with instructions stored in said one or more memories to associate said one or more comments with one or more portions of said second document based at least in part the compared one or more words in the first document and the compared one or more words in the second document.

12. The apparatus of claim 10, wherein said one or more processors are further programmed with instructions stored in said one or more memories to associate said one or more comments with one or more portions of said second document based at least in part the compared one or more structural elements in the first document and the compared one or more structural elements in the second document.

13. An apparatus comprising:
a comment migration means, comprising at least one processor, for associating one or more comments associated with one or more portions of a first document with one or more portions of a second document, said one or more portions of a second document chosen based at least in part on one or more determined similarities between said first document and said second document;
means, comprising said at least one processor, for identifying a relationship between said one or more comments and said one or more portions of the first document;
means, comprising said at least one processor, for modifying said relationship based, at least in part, on similarities and/or differences between an arrangement of one or more paragraphs, one or more sections, and/or one or more hierarchical aspects of said first document and said second document;
means, comprising said at least one processor, for migrating said one or more comments into said second document based, at least in part, on said modified relationship; and
means, comprising said at least one processor, for displaying said one or more comments and said second document such that said one or more comments are positioned proximal to said one or more portions of said second document.

14. The apparatus of claim 13, further comprising a document comparing means, comprising said at least one processor, for comparing a first document to a second document to at least in part determine one or more similarities between said first document and said second document.

15. The apparatus of claim 13, further comprising a document comparing means, comprising said at least one processor, for comparing one or more words of a first document and one or more words of a second document to at least in part determine one or more similarities between said first document and said second document.

16. The apparatus of claim 13, further comprising a document comparing means, comprising said at least one processor, for comparing one or more structural elements of a first document and one or more structural elements of a second document to at least in part determine one or more similarities between said first document and said second document.

17. An article comprising a storage medium comprising machine-readable instructions stored thereon which, executed by a computing platform, enable said computing platform to:
identify one or more comments associated with a portion of a first document;
identify a relationship between said one or more comments and said portion of the first document;
associate said one or more comments with an associated portion of a second document, said associated portion of a second document chosen based at least in part on one or more determined similarities between said first document and said second document;
modify said relationship based, at least in part, on similarities and/or differences between an arrangement of one or more paragraphs, one or more sections, and/or one or more hierarchical aspects of said first document and said second document;
migrate said one or more comments into said second document based, at least in part, on said modified relationship; and
display said one or more comments and said second document such that said one or more comments are positioned proximal to said associated portion of said second document.

18. The article of claim 17, wherein said machine-readable instructions, if executed by a computing platform, further enable said computing platform to determine said one or more determined similarities between said first document and said second document by comparing said first document and said second document.

19. The article of claim 18, wherein said second document comprises one or more portions of said first document.

20. The article of claim 19, wherein said second document comprises a modified version of said first document.

21. The article of claim 20, wherein comparing said first document and said second document comprises comparing one or more words in said first document and one or more words in said second document.

22. The article of claim 20, wherein comparing said first document and said second document comprises comparing one or more structural elements of said first document and one or more structural elements of said second document.

* * * * *

UNITED STATES PATENT AND TRADEMARK OFFICE
CERTIFICATE OF CORRECTION

PATENT NO.      : 7,657,524 B1
APPLICATION NO. : 11/193074
DATED           : February 2, 2010
INVENTOR(S)     : Laursen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 333 days.

Signed and Sealed this

Thirtieth Day of November, 2010

David J. Kappos
*Director of the United States Patent and Trademark Office*